United States Patent
Bralla

(10) Patent No.: US 9,987,737 B2
(45) Date of Patent: Jun. 5, 2018

(54) CONTROL METHOD FOR A MACHINE TOOL AND A MACHINE TOOL

(71) Applicant: Hilti Aktiengesellschaft, Schaan (LI)

(72) Inventor: Dario Bralla, Buchs (CH)

(73) Assignee: Hilti Aktiengesellschaft, Schaan (LI)

( * ) Notice: Subject to any disclaimer, the term of this patent is extended or adjusted under 35 U.S.C. 154(b) by 540 days.

(21) Appl. No.: 14/407,422

(22) PCT Filed: May 29, 2013

(86) PCT No.: PCT/EP2013/061042
§ 371 (c)(1),
(2) Date: Dec. 11, 2014

(87) PCT Pub. No.: WO2013/186050
PCT Pub. Date: Dec. 19, 2013

(65) Prior Publication Data
US 2015/0151419 A1    Jun. 4, 2015

(30) Foreign Application Priority Data

Jun. 15, 2012  (DE) .................. 10 2012 210 101

(51) Int. Cl.
*B25D 11/06* (2006.01)
*H01F 7/16* (2006.01)
(Continued)

(52) U.S. Cl.
CPC ............ *B25D 11/064* (2013.01); *B25D 11/04* (2013.01); *H01F 7/1615* (2013.01);
(Continued)

(58) Field of Classification Search
CPC .................................................. B25D 11/064
(Continued)

(56) References Cited

U.S. PATENT DOCUMENTS 3,811,313 A * 5/1974 Schut .................... B21J 7/30
173/117
4,237,987 A * 12/1980 Sherman ............... B25D 17/24
173/117
(Continued)

FOREIGN PATENT DOCUMENTS

CN       1255416 A      6/2000
CN     101203359 A      6/2008
(Continued)

OTHER PUBLICATIONS

English translation of Japanese Office Action issued in counterpart application No. 2015-516544 dated Feb. 1, 2016 (Two (2) pages).
(Continued)

*Primary Examiner* — Nathaniel Chukwurah
(74) *Attorney, Agent, or Firm* — Crowell & Moring LLP

(57) ABSTRACT

A machine tool and control method are disclosed. The machine tool has a tool receptacle which supports a chiseling tool so that it is movable along an axis of movement. A magneto-pneumatic striking mechanism has a primary drive, which is arranged around the axis of movement, and has a first magnetic coil and a second magnetic coil. On the axis of movement within the magnetic coils, the striking mechanism has a striker and riveting head. Furthermore, the striking mechanism has a pneumatic spring which acts on the striker. The control method provides for a pressure sensor which measures the prevailing pressure in the pneumatic spring during a movement of the striker in the direction opposite the striking direction. A controller initiates an acceleration phase at the start of a drop in pressure in the pneumatic spring. The primary drive accelerates the striker in the striking direction during the acceleration phase.

10 Claims, 4 Drawing Sheets

(51) Int. Cl.
  *H02K 33/12* (2006.01)
  *H02K 7/14* (2006.01)
  *H01F 7/18* (2006.01)
  *B25D 11/04* (2006.01)

(52) U.S. Cl.
  CPC .......... *H01F 7/1844* (2013.01); *H02K 7/145* (2013.01); *H02K 33/12* (2013.01); *B25D 2250/035* (2013.01); *B25D 2250/195* (2013.01); *B25D 2250/221* (2013.01); *H01F 2007/1692* (2013.01); *H02K 2213/03* (2013.01)

(58) Field of Classification Search
  USPC ......... 173/114, 117, 201, 212, 104; 188/267
  See application file for complete search history.

(56) References Cited

U.S. PATENT DOCUMENTS

| | | | | |
|---|---|---|---|---|
| 4,862,043 A * | 8/1989 | Zieve | ............... | B21J 15/24 29/243.54 |
| 5,497,555 A * | 3/1996 | Averbukh | ........... | B25D 11/064 173/117 |
| 6,215,206 B1 * | 4/2001 | Chitayat | ............... | A61M 1/34 310/12.14 |
| 6,520,269 B2 * | 2/2003 | Geiger | ............... | B25D 11/064 173/114 |
| 6,796,477 B2 * | 9/2004 | Chen | ............... | B27F 7/11 227/131 |
| 6,854,530 B1 * | 2/2005 | Yiu | ............... | B25C 1/06 173/1 |
| 7,025,183 B2 * | 4/2006 | Steffen | ............... | B25D 11/064 173/114 |
| 2008/0314608 A1 * | 12/2008 | Berger | ............... | B25D 11/064 173/132 |
| 2009/0065226 A1 * | 3/2009 | John | ............... | B25D 11/005 173/6 |
| 2010/0206593 A1 | 8/2010 | Schad et al. | | |
| 2010/0236802 A1 | 9/2010 | Berger et al. | | |

FOREIGN PATENT DOCUMENTS

| | | |
|---|---|---|
| CN | 101244552 A | 8/2008 |
| CN | 101797745 A | 8/2010 |
| DE | 198 55 750 A1 | 6/2000 |
| DE | 10 2005 030 340 B3 | 1/2007 |
| DE | 10 2007 000 386 A1 | 1/2009 |
| DE | 10 2007 000 488 A1 | 3/2009 |
| DE | 10 2009 000 363 A1 | 7/2010 |
| EP | 1 958 733 A2 | 8/2008 |
| EP | 2 036 680 A2 | 3/2009 |
| EP | 2 043 238 A1 | 4/2009 |
| GB | 2 205 003 A | 11/1988 |
| JP | 2000-167783 A | 6/2000 |
| JP | 2008-544871 A | 12/2008 |

OTHER PUBLICATIONS

Chinese Office Action issued in counterpart Chinese Application No. 201380031455.3 dated Aug. 25, 2015, with partial English translation (Fifteen (15) pages).
Chinese Second Office Action issued in Chinese counterpart application No. 2013800314455.3 dated Sep. 30, 2016 (Eight (8) pages).
International Search Report dated Sep. 3, 2013 (Two (2) pages).
German Search Report dated Mar. 1, 2013 (Three (3) pages).

* cited by examiner

CONTROL METHOD FOR A MACHINE TOOL AND A MACHINE TOOL

This application claims the priority of International Application No. PCT/EP2013/061042, filed May 29, 2013, and German Patent Document No. 10 2012 210 101.2, filed Jun. 15, 2012, the disclosures of which are expressly incorporated by reference herein.

BACKGROUND AND SUMMARY OF THE INVENTION

The present invention relates to a control method for a machine tool, which can drive a chiseling tool. A striker is accelerated directly by magnetic coils and strikes the tool. Machine tools of this type are known from the publication US 2010/0206593.

A machine tool has a tool receptacle, which is equipped to support a chiseling tool movably along an axis of movement. A magneto-pneumatic striking mechanism includes a primary drive, which is arranged around the axis of movement and has a first magnetic coil and a second magnetic coil in that order in the striking direction. The striking mechanism has a striker and a riveting head in that order in the striking direction on the axis of movement within the magnetic coil. Furthermore, the striking mechanism has a pneumatic spring acting on the striker in the striking direction. The respective inventive control method provides that during movement of the striker opposite the striking direction, a pressure sensor measures a prevailing pressure in the pneumatic spring. At the start of a drop in pressure in the pneumatic spring, a controller initiates an acceleration phase. The primary drive accelerates the striker in the striking direction during the acceleration phase.

The machine tool advantageously has a permanently and radially magnetized ring magnet between the first magnetic coil and the second magnetic coil along the striking direction comprised of a plurality of permanent magnets, for example. According to one embodiment of the control method, a first magnetic field generated within the first magnetic coil by the first magnetic coil is superimposed destructively on the magnetic field of the ring magnet during the acceleration phase and a second magnetic field generated within the second magnetic coil by the second magnetic coil is superimposed constructively on the magnetic field of the ring magnet during the acceleration phase.

One embodiment provides that in an active recovery phase, the striker is accelerated against the striking direction by means of the primary drive until the kinetic energy of the striker is sufficient to achieve the compression of the pneumatic spring that has been selected as a function of the striking energy of the striker. Until reaching the selected compression of the pneumatic spring, the active recovery phase is preferably followed by a resting phase, during which the primary drive is deactivated. Deactivation of the primary drive has proven advantageous to increase the efficiency of the striking mechanism. The efficiency of the primary drive drops with an increase in the compression of the pneumatic spring because the striker increasingly overlaps completely with the first magnetic coil. The duration of the resting phase is at least 10% of the duration of the active recovery phase, for example.

The inventive machine tool has a tool receptacle, which is equipped to support a chiseling tool movably along an axis of movement. A magneto-pneumatic striking mechanism has a primary drive, which is arranged around the axis of movement and has a first magnetic coil, a permanently and radially magnetized ring magnet, for example, comprised of permanent magnets, and a second magnetic coil, following one another in that order in the striking direction. The striking mechanism has a striker and a riveting head in that order in the striking direction on the axis of movement within the magnetic coils. Furthermore, the striking mechanism has a pneumatic spring, which acts on the striker in the striking direction. The pneumatic spring may be arranged partially or completely inside the first magnetic coil. A pressure sensor is provided for determining the pressure in the pneumatic spring. A controller may carry out the control method according to the invention or an embodiment thereof.

BRIEF DESCRIPTION OF THE FIGURES

The following description illustrates the invention on the basis of exemplary embodiments and figures, in which.

DETAILED DESCRIPTION OF THE FIGURES

Figure 1:
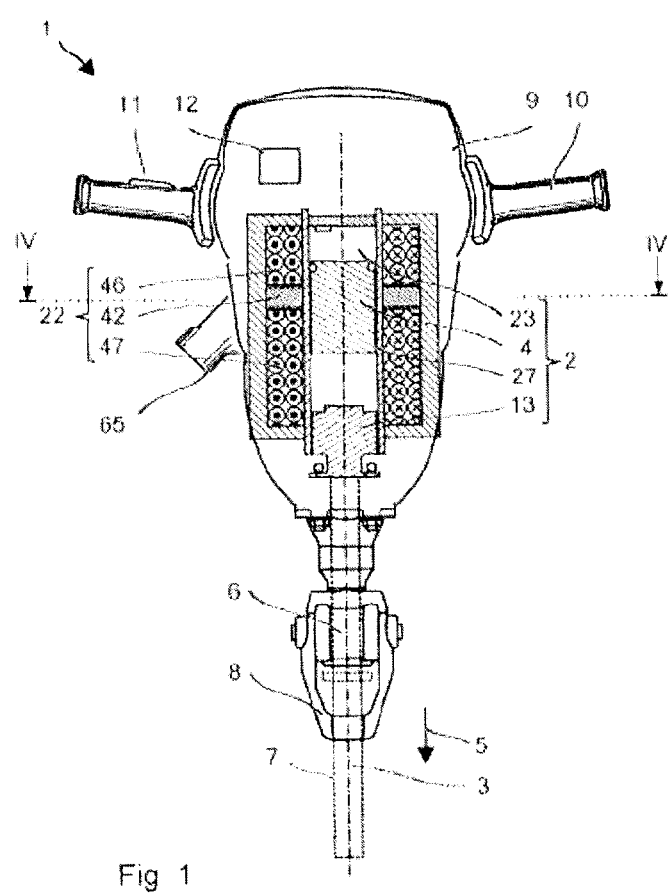
FIG. 1 shows an electric chisel.

The same elements or those having the same function are indicated by the same reference numerals in the figures, unless otherwise indicated.

FIG. 1 shows a hand-held electric chisel 1 as an example of a chiseling machine tool. A magneto-pneumatic striking mechanism 2 generates strikes in a striking direction 5 periodically or aperiodically by means of a striker 4 guided on an axis of movement 3. A tool receptacle 6 holds a chiseling tool 7 in contact with the striking mechanism 2 on the axis of movement 3. The chiseling tool 7 is guided movably along the axis of movement 3 in the tool receptacle 6 and can penetrate into a substrate, for example, driven by the striker in the striking direction 5. A lock 8 limits the axial movement of the chiseling tool 7 in the tool receptacle 6. The lock 8 is a pivotable strap, for example, and is preferably manually unlockable without any assistance in order to be able to replace the chiseling tool 7.

The striking mechanism 2 is arranged in a machine housing 9. A handle 10 formed on the machine housing 9 allows the user to hold the electric chisel 1 and guide it during operation. A system switch 11, with which the user can operate the striking mechanism 2 is preferably mounted on the handle 10. The system switch 11 activates a controller 12 of the striking mechanism 2, for example.

Figure 2:
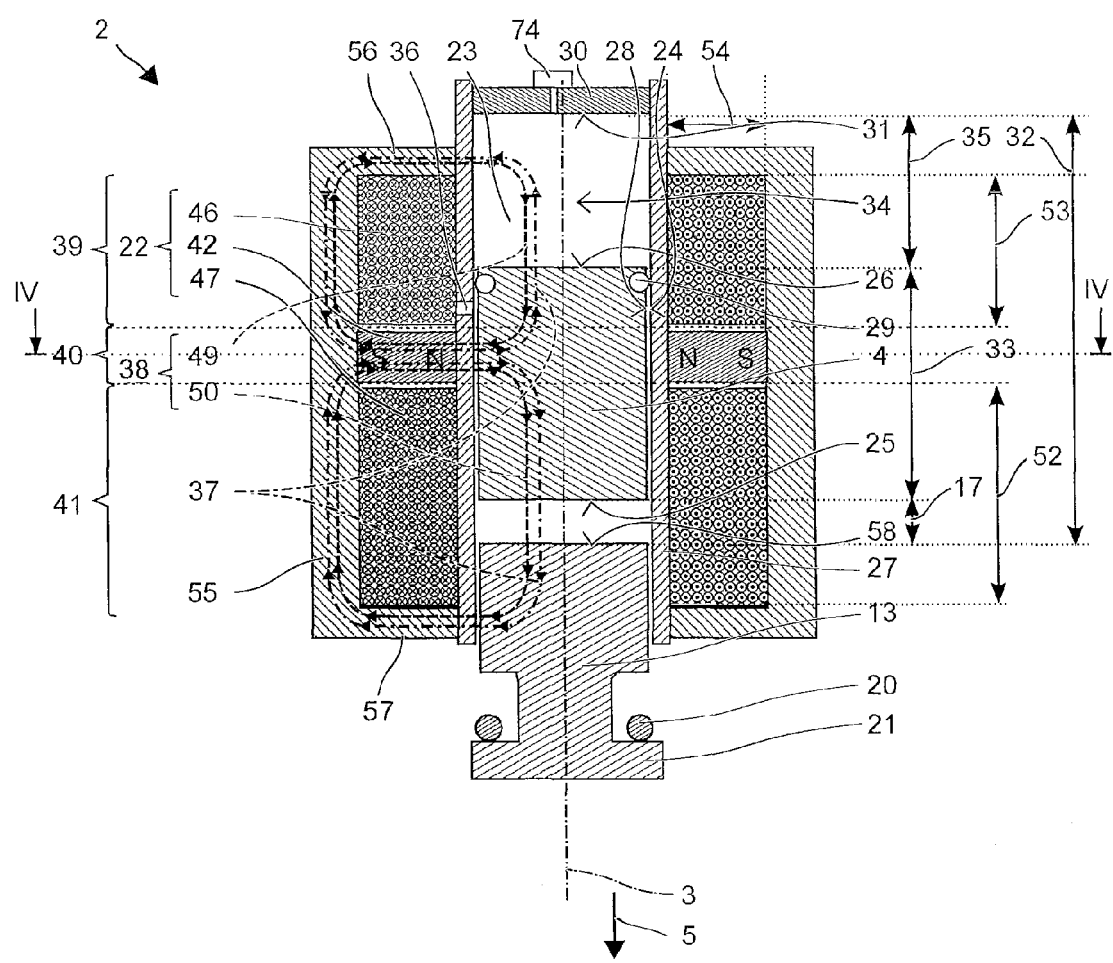
FIG. 2 shows a striking mechanism of the electric chisel.

FIG. 2 shows the magneto-pneumatic striking mechanism 2 in a longitudinal section. The striking mechanism 2 has only two movable components, a striker 4 and a riveting head 13. The striker 4 and the riveting head 13 are situated on the common axis of movement 3. The riveting head 13 follows the striker 4 in the striking direction 5. The striker 4 is moved back and forth on the axis of movement 3 between an impact point 14 and an upper turning point 15.

At the point of impact 14, the striker 4 strikes the riveting head 13. The position of the impact point 14 along the axis is predefined by the riveting head 13. The riveting head 13 preferably rests in its basic position 16 and preferably returns to this basic position 16 after each strike, before the striker 4 strikes the riveting head 13 the next time. This preferred operation is assumed for the following description. However, the magneto-pneumatic striking mechanism 2 has a high tolerance with respect to the actual position of the riveting head 13, in contrast with a traditional pneumatic striking mechanism 2. The riveting head may be moved out of position in the striking direction 5 in comparison with the basic position 16 with one strike. The basic position 16 thus indicates the earliest position along the striking direction 5, at which the striker 4 can strike the riveting head 13.

Figure 3:
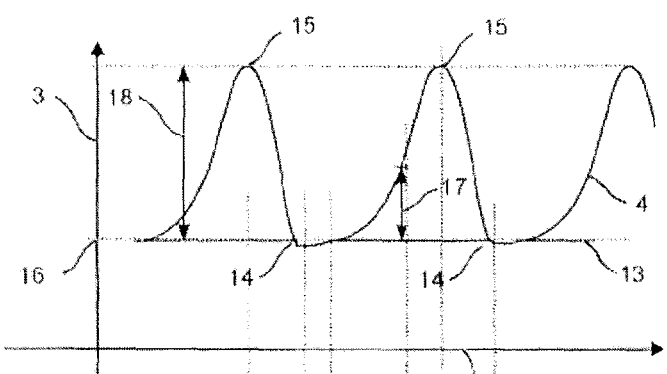
FIG. 3 shows the movement of the striker and riveting head.

The distance 17 of the striker 4 from the striking head 13 is the greatest at the upper turning point 15 and hereinafter a distance traveled by the striker 4 is referred to as the stroke 18. FIG. 3 illustrates schematically the movement of the striker 4 and of the riveting head 13 in three successive strikes over time 19.

In a resting position, the striker 4 is typically in contact with the rive ting head 13. For a strike, the striker 4 is moved back opposite the striking direction 5 and is accelerated in the striking direction 5 after reaching the upper turning point 15. At the end of its movement in the striking direction 5, the striker 4 strikes the riveting head 13 at the point of impact 14. The riveting head 13 absorbs much more than half of the kinetic energy of the striker 4 and is deflected in the striking direction 5. The riveting head 13 advances the chiseling tool 7, which is in contact with it in the striking direction 5, in front of itself into the substrate. The user presses the striking mechanism 2 in the striking direction 5 against the substrate so that the riveting head 13 is pushed back into its basic position 16, preferably indirectly by the chiseling tool 7. The riveting head 13 is in contact with a stop 20 mounted on the housing in the basic position in the striking direction 5. The stop 20 may contain a damping element, for example. The exemplary riveting head 13 has radially protruding wings 21, which may be in contact with the stop 20.

The striker 4 is driven in a noncontact operation by a magnetic primary drive 22. The primary drive 22 raises the striker 4 in the direction opposite the striking direction 5. As explained below, the primary drive 22 is preferably active only temporarily during the raising of the striker 4 to the upper turning point 15. The primary drive 22 accelerates the striker 4 after passing the upper turning point 15, until reaching the impact point 14. The primary drive 22 may be activated approximately simultaneously with passing the upper turning point 15. The primary drive 22 preferably remains active until impact. A pneumatic spring 23 supports the primary drive 22 during the movement of the striker 4 in the striking direction 5 from the upper turning point until just before the impact point. The pneumatic spring 23 is arranged in front of the striker 4 on the axis of movement 3 in the striking direction 5 and acts on the striker 4.

The striker 4 consists mainly of a cylindrical base body whose lateral surface 24 is parallel to the axis of movement 3. A front end face 25 faces in the striking direction 5. The front end face 25 is flat and covers the entire cross section of the striker 4. A rear end face 26 is preferably also flat. The striker 4 is inserted into a guide tube 27. The guide tube 27 is coaxial with the axis of movement 3 and has a cylindrical inside wall 28. The lateral surface 24 of the striker 4 is in contact with the inside wall 28. The striker 4 is force-guided in the guide tube 27 on the axis of movement 3. A cross section of the striker 4 and a hollow cross section of the guide tube 27 are coordinated with one another with an accurate fit except for a small running play. The striker 4 seals the guide tube 27 like a flying seal. A sealing ring 29 made of rubber may be inserted into the lateral surface 24 to compensate for tolerances in manufacturing.

The guide tube 27 is closed on its forward end in the striking direction 5. In the exemplary embodiment, a closure 30 is inserted into the guide tube 27 whose cross section corresponds to the hollow cross section of the guide tube 27. The closure area 31 directed inward is preferably flat and perpendicular to the axis of movement 3. The closure 30 is mounted at a fixed distance 32 from the stationary riveting head 13 in the basic position 16. The hollow space between the closure 30 and the riveting head 13 in the basic position 16 is the range of the guide tube 27, which is effective for the striker 4, within which the striker 4 can move. The maximum stroke 18 is essentially the distance 32 minus the length 33 of the striker 4.

The guide tube 27, which is closed at one end and the striker 4 seal a pneumatic chamber 34. A volume of the pneumatic chamber 34 is proportional to a distance 35 between the closure area 31 and the rear end face 26 of the striker. The volume is variable due to the striker 4, which can move along the axis of movement 3. The air, which is compressed or decompressed with a movement in the pneumatic chamber 34 provides the effect of the pneumatic spring 23. The maximum volume is assumed by the pneumatic chamber 34 at the impact point 14, i.e., when the striker 4 strikes the riveting head 13. The pressure in the pneumatic chamber 34 is the lowest here and is advantageously equal to the ambient pressure. Let us assume that the potential energy of the pneumatic spring 23 is equal to zero by definition at the impact point 14. The lowest volume is achieved by the pneumatic chamber 34 at the upper turning point 15 of the striker 4; the pressure may rise to approximately 16 bar. The stroke of the striker 4 is limited by a control method to adjust the volume and the pressure of the pneumatic chamber 34 at a target value at the upper turning point 15. The potential energy of the pneumatic spring 23 should be within a narrow value range at the upper turning point 15, regardless of external influences. In particular this makes the striking mechanism 2 robust with respect to the position of the riveting head 13 in impact although its position has a great influence the flight time of the striker 4 up to the upper turning point 15.

The pneumatic spring 23 is provided with one or more vent openings 36 to compensate for losses in the amount of air in the pneumatic spring 23. The vent openings 36 are closed by the striker 4 during compression of the pneumatic spring 23. The striker 4 preferably releases the vent openings 36 just before the impact point 14 when the pressure in the pneumatic spring 23 differs by less than 50% from the ambient pressure. In the exemplary embodiment, the striker 4 is running over the one vent opening 36 when it has traveled a distance of more than 5% of its stroke 18 from the impact position.

The primary drive 22 is based on reluctance forces, which act on the striker 4. The base body of the striker 4 is made of a soft magnetic steel. In comparison with a permanent magnet, the striker 4 is characterized by its low coercitive field strength of less than 4000 A/m, preferably less than 2500 A/m. An external magnetic field having this low field strength can reverse the polarization of the striker 4. An applied external magnetic field draws the magnetizable striker 4 into regions of extremely high field strength, regardless of their polarity.

The primary drive 22 has a cavity along the axis of movement 3, the guide tube 27 being inserted into this cavity. The primary drive 22 also generates a permanent magnetic field 37 and a two-part switchable magnetic field 38 in the cavity and within the guide tube. The magnetic fields 37, 38 divide the cavity and the effective region of the guide tube 27 along the axis of movement 3 into an upper section 39, a central section 40 and a lower section 41. Field lines of the magnetic fields 37, 38 run in the upper section 39 and the lower section 41 largely parallel to the axis of movement 3 and in the central section 40 largely perpendicular to the axis of movement 3. The magnetic fields 37, 38 differ in their parallel and antiparallel orientation of the field lines relative to the striking direction 5. The field lines (dash-dot pattern) of the permanent magnetic field 37, a detail of which is shown here, run largely antiparallel to the striking direction 5 in the upper section 39 of the guide tube 27 and run largely parallel to the striking direction 5 in a bottom section 41 of the guide tube 27. For the function of the striking mechanism 2 the difference in the direction of travel of the field lines of the permanent magnetic field 37 in the upper section 39 in comparison with the direction of travel in the lower section 41 is important. Inside the upper section 39 and the lower section 41 of the guide tube 27, the field lines of the switchable magnetic field 38 run largely in the striking direction 5 during one phase (shown with dotted lines), and during another phase (not shown), they run inside of both sections 39, 41 largely antiparallel to the striking direction 5. The permanent magnetic field 37 and the switchable magnetic field 38 are thus superimposed destructively in one of the two sections and constructively in the other of the sections. In which of the sections the magnetic fields 37, 38 will be superimposed constructively depends on the instantaneous switch cycle of the controller 12. The striker 4 is drawn into section 39, 41 with a constructive superpositioning. An alternating repolarization of the switchable magnetic field 38 drives the back-and-forth movement of the striker 4.

Figure 4:
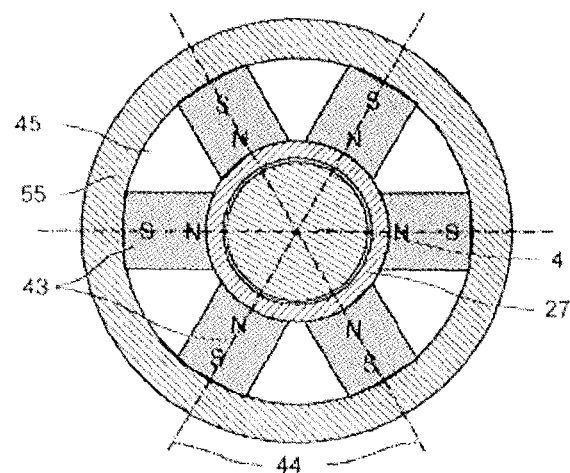
FIG. 4 shows a section through the striking mechanism in the plane IV-IV.

The permanent magnetic field 37 is generated by a radially magnetized ring magnet 42 comprised of a plurality of permanent magnets 43. FIG. 4 shows the ring magnet 42 in a section in the plane IV-IV. The permanent magnets 43 shown as examples are preferably rod magnets. The permanent magnets 43 are oriented in a radial direction. Their magnetic field axes 44, i.e., from their south pole to their north pole, stand at a right angle to the axis of movement 3. The permanent magnets 43 are all oriented in the same way, namely with their north pole N, pointing to the axis of movement 3 in the example shown here, and their south pole S, pointing away from the axis of movement 3. In the circumferential direction, an air gap or a non-magnetizable material 45, e.g., plastic, may be provided between the permanent magnets 43. The ring magnet 42 is arranged along the axis of movement 3 between the closure area 31 and the riveting head 13. The ring magnet 42 is preferably arranged asymmetrically, in particular being closer to the closure area 31 than to the riveting head 13. The position of the ring magnet 42 divides the guide tube 27 along the axis of movement 3 into an upper section 39, which is in front of the ring magnet 42 in the striking direction 5, and a lower section 41, which comes after the ring magnet 42 in the striking direction 5. The field lines run largely in the opposite direction in the upper section 39 in comparison with the field lines in the lower section 41. The permanent magnets 43 preferably comprise an alloy of neodymium. The field strength at the poles of the permanent magnets 43 is preferably greater than 1 Tesla, for example, 2 Tesla.

Figure 5:
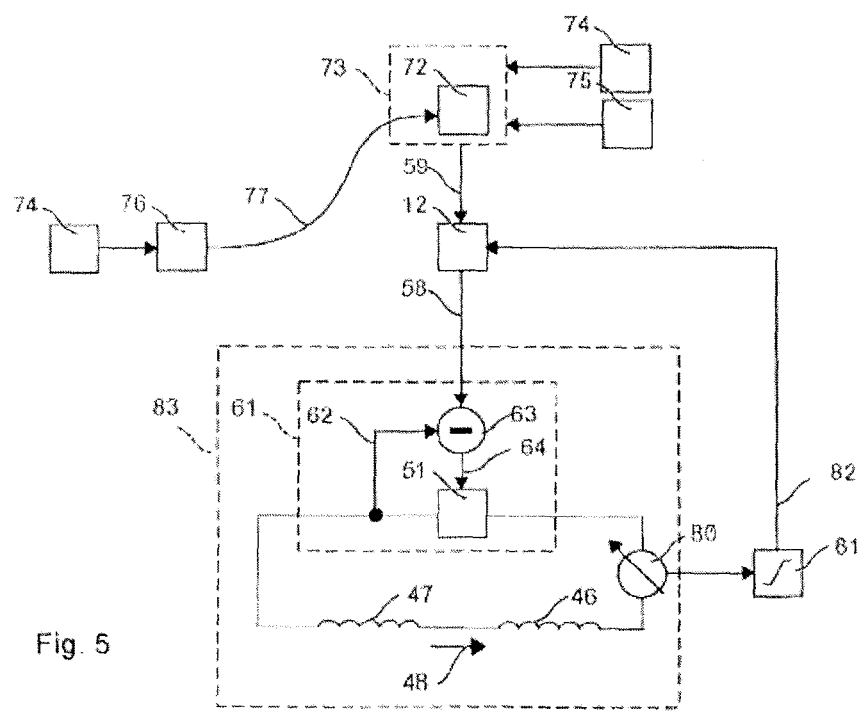
FIG. 5 shows the electric wiring of the striking mechanism.

The switchable magnetic field 38 is generated by an upper magnetic coil 46 and a lower magnetic coil 47. The upper magnetic coil 46 is in front of the ring magnet 42 in the striking direction 5, preferably being in direct contact with the ring magnet 42. The upper magnetic coil 46 encloses the upper section 39 of the guide tube 27. The lower magnetic coil 47 is arranged after the ring magnet 42 in the striking direction 5, preferably being in contact with it, and surrounds the lower section 41. The two magnetic coils 46, 47 have a current 48 flowing through them in the same peripheral direction around the axis of movement 3. The upper magnetic field 49 generated by the upper magnetic coil 46 and the lower magnetic field 50 generated by the magnetic coil 47 are largely parallel to the axis of movement 3 and both are oriented in the same direction along the axis of movement 3, i.e., the field lines of the two magnetic fields 49, 50 either run inside the guide tube 27 in the striking direction 5 or opposite the striking direction 5. The current 48 is fed from a controllable current source 51 into the magnetic coils 46, 47. The two magnetic coils 46, 47 and the current source 51 are preferably connected in series (FIG. 5).

A length 52, i.e., the dimension along the axis of movement 3, of the lower magnetic coil 47 is preferably greater than the length 53 of the upper magnetic coil 46, with the length ratio being in the range between 1.75:1 and 2.25:1. The respective amounts of the magnetic coils 46, 47 relative to the field strength of the upper magnetic field 49 and/or to the field strength of the lower magnetic field 50 inside the guide tube 27 are preferably the same. The ratio of the number of windings of the upper magnetic coil 46 to the number of windings of the lower magnetic coil 47 may correspond to the length ratio. Radial dimensions 54 and the current area density are preferably the same for both magnetic coils 46, 47 (not including the other components of the striking mechanism).

A magnetic yoke 55 can conduct the magnetic fields 37, 38 outside of the guide tube 27. For example, the yoke 55 has a hollow cylinder or a cage comprised of a plurality of ribs running along the axis of movement 3, surrounding the two magnetic coils 46, 47 and the ring magnet 42 of permanent magnets 43. A ring-shaped upper closure 56 of the yoke 55 covers the upper magnetic coil 46 in the direction opposite the striking direction 5. A ring-shaped lower seal 57 is adjacent to the guide tube 27 at the height of the riveting head 13. The lower seal 57 covers the lower magnetic coil 47 in the striking direction 5. The magnetic fields 37, 38 are guided in parallel or antiparallel to the axis of movement 3 in the upper section 39 and the lower section 41. The magnetic fields 37, 38 are supplied by the yoke 55, in particular the ring-shaped seals 56, 57 in the radial direction. A radial return takes place in the lower section 41 largely inside the riveting head 13. The field lines are thus preferably perpendicular on the end face 26 of the striker 4 and the striking area 58 of the riveting head 13. The radial return in the upper section 39 may be unguided, i.e., through the air into the yoke 55.

The magnetic yoke 55 is made of a magnetizable material, preferably electroplate. The guide tube 27 is not magnetizable. Suitable materials for the guide tube 27 include chrome steel or aluminum or plastics as alternatives. The closure 30 of the guide tube 27 is preferably made of a non-magnetizable material.

The striker 4 overlaps with the two magnetic coils 46, 47, preferably in each of its positions. In particular the rear end face 26 protrudes into the upper magnetic coil 46 when the striker 4 is in contact with the riveting head 13 or it protrudes at least into the ring magnet 42. The rear end face 26 protrudes at least beyond the axial center of the ring magnet 42. The vent opening 36 of the pneumatic chamber 34 is arranged at the axial height of an end of the upper magnetic coil 46 facing the ring magnet 42. The distance from the ring magnet 42 is preferably less than 1 cm.

A controller 12 of the striking mechanism 2 triggers the current source 51. The current source 51 sets the current 48 output by it at a target value 60, which is predefined by the controller 12 by means of a control signal 59. The current source 51 preferably includes a control circuit 61 to stabilize the output current 48 at the target value 60. A pickup measures the actual current 62. A differential amplifier 63 forms a manipulated variable 64 from the actual current 48 and the target value 60 and feeds it to the current source 51 for triggering the delivery of current. The current source 51 is supplied by a power supply 65, for example, a power supply or a battery pack.

Figure 6:
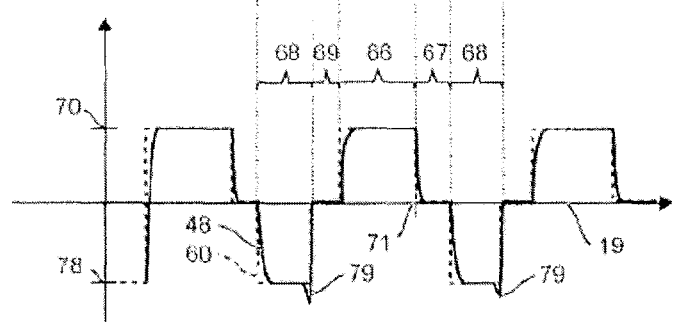
FIG. 6 shows a control diagram.

The controller 12 switches the target value 60 and, indirectly, the current 48 during a back-and-forth movement of the striker 4. FIG. 6 illustrates an example of a recurring switch pattern over time 19. The switch pattern is divided into essentially three different phases. A cycle begins with an active recovery phase 66. During the active recovery phase 66, the striker 4 is accelerated in the direction opposite the striking direction 5, starting from the impact position. The active recovery phase 66 ends when the pneumatic spring 23 has achieved a predefined potential energy. A resting phase 67 follows the active recovery phase 66 directly and ends when the striker 4 has reached the upper turning point 15. The acceleration phase 68 begins during or after the point when the striker 4 passes the upper turning point 15. During the acceleration phase 68, the striker 4 is accelerated in the striking direction 5, preferably continuously, until the striker 4 strikes the riveting head 13. Depending on the desired striking frequency, a pause 69 may be inserted after the acceleration phase 68 and before the next active recovery phase 66 begins.

The controller 12 initiates a new strike with an active recovery phase 66. The controller 12 sets a first value 70 as the target value 60 for the regulated current source 51. The sign of the first value 70 indicates that the current 48 circulates in the magnetic coils so that the magnetic field 49 of the upper magnetic coil 46 is constructively superimposed on the permanent magnetic field 37 in the upper section 39 of the guide tube 27. The striker 4 is then accelerated in the direction opposite the striking direction 5 in the upper section 39 and opposite the force of the pneumatic spring 23. The kinetic energy of the striker 4 increases continuously. Because of the reverse movement, the pneumatic spring 23 is compressed at the same time and the potential energy stored in it increases because of volume work expended.

The current 48 preferably flows through both magnetic coils 46, 47. The magnetic fields 37, 38 are preferably superimposed destructively in the lower section 41. The amount of the first value 70 can be selected so that the magnetic field 50 generated by the lower magnetic coil 47 destructively compensates for the permanent magnetic field 37 of the permanent magnets 43. The magnetic field strength in the lower section 41 is preferably reduced to zero or less than 10% of the magnetic field strength in the upper section 39. The current source 51 and the magnetic coils 46, 47 are designed for the current 48 with the amperage of the first value 70. The first value 70 may be kept constant during the active recovery phase 66.

The controller 12 triggers the end of the active recovery phase 66 based on a prognosis for the potential energy of the pneumatic spring 23 in the upper turning point 15. The primary drive 22 is deactivated, for example, when the potential energy will reach a target value without any further support by the primary drive 22. This takes into the account the fact that at point in time 71 of the shutdown of the primary drive 22, the potential energy has already achieved a portion of the target value and the prevailing kinetic energy of the striker 4 up to the upper turning point 15 is converted into the portion of the target value that was previously missing. Losses in this conversion can be taken into account by a table 72 stored in the controller 12. The target value is in the range between 25% and 40%, for example, at least 30% and at most 37% of the impact energy of the striker 4.

A prognosis unit 73 continuously compares the operating conditions of the striking mechanism 2. An example of a prognosis is based on a pressure measurement. The prognosis unit 73 picks up the signals of the pressure sensor 74. The measured pressure is compared with a threshold value. If the pressure exceeds the threshold value, the prognosis unit 73 outputs a control signal 59 to the controller 12. The control signal 59 signals that the potential energy will reach the target value if the primary drive 22 is shut down immediately. The controller 12 terminates the active recovery phase 66.

The prognosis unit 73 preferably loads the threshold value out of the saved lookup table 72. The lookup table 72 may contain precisely one threshold value but preferably a plurality of threshold values determined for different operating conditions have been stored in advance. For example, threshold values for different temperatures in the pneumatic chamber 34 may be stored. In addition to the signal of the pressure sensor 74, the prognosis unit 73 also picks up a signal of a temperature sensor 75. The threshold value is selected as a function of the latter.

In addition, the prognosis unit 73 can estimate the speed of the striker 4 on the basis of a change in pressure. The lookup table 72 may contain various threshold values for the prevailing pressure for different speeds. Since a faster striker 4 tends to compress the pneumatic spring 23 to a greater extent, the threshold value for a higher speed is lower than that for a lower speed. The choice of the threshold value as a function of the speed or the change in pressure can improve the reproducibility of the target value.

The end of the active recovery phase 66 is at the same time the start of the resting phase 67. The controller 12 sets the target value 60 for the current 48 at zero. The switchable magnetic field 38 is shut down and the primary drive 22 is deactivated. The permanent magnetic field 37 acts on the striker 4 but since the permanent magnetic field 37 has an essentially constant field strength along the axis of movement 3, it exerts little or no force on the striker 4.

Instead of reducing the current 48 to zero, the current 48 may be set during the resting phase 67 at a negative value in relation to the target value 60. This dissipates the remanence in the striker 4. The amount of current 48 in comparison with that of the target value 60 is low, e.g., lower than 10%, in order not to interfere with the reverse movement.

The striker 4 is decelerated by the pneumatic spring 23 to a standstill during the resting phase 67. The potential energy of the pneumatic spring 23 increases by a portion of the kinetic energy of the striker 4 before the striker 4 comes to a standstill, i.e., at the upper turning point 15.

The sequence of the active recovery phase 66 and the resting phase 67 has proven to be especially energy efficient in the tested superstructures of the striking mechanism, in particular the shutdown of the current 48 to zero at the end of the active recovery phase 66. The efficiency of the primary drive 22 declines with a decrease in the distance 35 of the striker 4 from the upper turning point 15. The striker 4 is accelerated to a high speed as long as the primary drive 22 is operating efficiently. If the prognosis indicates that the striker 4 will now reach the desired upper turning point 15 without the primary drive 22, then the increasingly inefficient primary drive 22 will be deactivated. In one alternative, the current 48 is lowered continuously or in several increments to zero. An adaptive adjustment of the trajectory of the striker 4 to reach the upper turning point 15 may be performed here at the cost of efficiency. In this alternative, the resting phase 67 preferably follows before reaching the upper turning point 15.

The duration of the active recovery phase 66 is derived from the prognosis. The duration may turn out to be different, depending on the operation, or from one strike to the next. For example, the riveting head 13 does not reach its basic position 16 before a strike so that the striker 4 must travel a greater distance for the next strike. If there is a fixed duration of the active recovery phase 66, the kinetic energy thereby absorbed for the striker 4 would not be sufficient against the force of the pneumatic spring 23 up to the desired upper turning point 15.

The controller 12 triggers the end of the resting phase 67 based on reaching the upper turning point 15. The acceleration phase 68 begins with the end of the resting phase 67. The controller 12 triggers the onset of the acceleration phase 68 on the basis of the returning movement of the striker 4. A position sensor or movement sensor can detect the reversing movement of the striker 4 directly. Detection of the reversing movement is based indirectly on a change in pressure in the pneumatic chamber 34.

A pressure sensor 74 is connected to the pneumatic chamber 34. The pressure sensor 74 is a piezo-resistive pressure sensor 74, for example. The pressure sensor 74 may be arranged in the pneumatic chamber 34 or may be connected by an air duct to the pneumatic chamber 34.

The pressure sensor 74 is preferably arranged in or on the closure 30. An evaluation unit 76 is preferably assigned to the pressure sensor 74. The evaluation unit 76 monitors the change in pressure in the pneumatic chamber 34. As soon as the change in pressure assumes a negative value, i.e., the pressure is dropping, the evaluation unit 76 delivers a control signal 77, indicating that the upper turning point 15 has been reached by the striker 4 to the controller 12.

Analysis of the pressure change necessarily leads to a minor delay due to the process until detecting that the upper turning point 15 has been reached or more precisely exceeded. The pressure can also be detected in absolute terms and compared with a threshold value. If the pressure reaches the threshold value, then output of the control signal 77 is triggered. The pressure in the pneumatic chamber 34 can be measured at the upper turning point 15 and saved as the threshold value in a table in the evaluation unit 76. The threshold value may be stored as a function of various operating conditions, in particular the temperature in the pneumatic chamber 34. The evaluation unit 76 determines the prevailing operating condition, for example, by query of a temperature sensor, and reads out the respective threshold value from the table. These two methods may be combined for redundancy and may output the control signals 77 separately from one another.

The controller 12 begins the acceleration phase 68 when the control signal 77 is received. The controller 12 sets the target value 60 for the current 48 at a second value 78. The sign of the second value 78 is selected so that the lower magnetic field 50 of the lower magnetic coil 47 is constructively superimposed on the permanent magnetic field 37 inside the guide tube 27. The result is thus a high field strength in the lower section 41 of the guide tube 27. During the acceleration phase 68, the current 48 is fed into the lower magnetic coil 47 and preferably into the upper magnetic coil 46. The permanent magnet 37 in the upper section 39 is preferably dampened or is compensated in a completely destructive manner by the magnetic field 38 of the upper magnetic coil 46 within the guide tube 27. The striker 4 is drawn into the stronger magnetic field in the lower section 41. The striker 4 constantly experiences acceleration in the striking direction 5 during the acceleration phase 68. The kinetic energy achieved by the impact point 14 is approximately the impact energy of the striker 4.

An alternative or additional determination of achieving the upper turning point 15 is based on a change in the voltage induced in the upper magnetic coil 46 based on the movement of the striker 4. The striker 4 may already overlap with the upper yoke ring 56 even before reaching the upper turning point 15. In the upper region 39, the magnetic field 49 flows over the striker 4 into the upper yoke ring 56 in an almost closed circuit without an air gap. The magnetic field 50 flows over a large air gap to the lower yoke ring 57 in the lower region 41. During the movement of the striker 4 up to the turning point 15, the air gap increases further in the lower region 41 so that the magnetic flux in the upper region is increased proportionately. As soon as the striker 4 has reversed itself at the turning point 15, the proportion of the magnetic flux in the upper region 39 is reduced. The change in the magnetic flux induces a voltage in the upper magnetic coil 46. A change in the sign of the induced voltage is characteristic of the turning point 15. Before reaching the turning point 15, the current source 51 preferably regulates the current 48 at zero to maintain the resting phase 67. The control loop continuously adapts the manipulated variable 64 to keep the current 48 at zero against the induced voltage. The control loop 62 responds to the change in sign of the induced voltage with a definitely larger manipulated variable 64. The control signal 77 may thus be triggered by the manipulated variable 64 on exceeding a threshold value, for example.

The amount of the second value 78 is preferably coordinated so that the upper magnetic field 49 destructively compensates the permanent magnetic field 37 or drops to at least 10% of its field strength. The current 48 in the magnetic coils 46, 47 increases to the target value 60 at the start of the acceleration phase 68. One switch flank is defined, for example, only by a time constant, which is obtained on the basis of the inductance of the magnetic coils 46, 47 and the feedback effect of the striker. The controller 12 keeps the target value 60 at the second value 78 preferably continuously during the acceleration phase 68.

The pneumatic spring 23 supports the acceleration of the striker 4 in the striking direction 5. In doing so the potential energy stored in the pneumatic spring 23 is converted largely to kinetic energy of the striker 4. At the impact point 14 the pneumatic spring 23 is preferably relaxed completely. Near the impact point 14 the vent opening 36 is released by the striker 4. The vent opening 36 results in weakening of the pneumatic spring 23 without completely reducing its effect on the striker 4 to zero. However, at this point in time, the pneumatic spring 23 has already transferred much more than 90% of its potential energy to the striker 4.

The controller 12 triggers the end of the acceleration phase 68 based on a rise 79 in the current 48 in the lower magnetic coil 47 and/or in the current 48 supplied by the current source 51. While the striker 4 is moving, this results in a voltage drop because of the electromagnetic induction via the lower magnetic coil 47, and the current source 51 supplies the current 48 against this voltage drop. The voltage drop disappears suddenly with the strike and the stationary striker 4. The current 48 increases briefly until the regulated current source 51 has again regulated the current 48 at the target value 60.

A current sensor 80 can detect the current 48 circulating in the lower magnetic coil 47. A respective discriminator 81 compares the measured current 48 with a threshold value and outputs an end signal 82 on exceeding the threshold value. The end signal 82 indicates to the controller 12 that the striker 4 has struck the riveting head 13. The threshold value is selected, for example, as a function of the second value 78, i.e., the target value 60 for the acceleration phase 68. The threshold value may be 5% to 10% greater than the second value 78. Alternatively or in addition to detecting the absolute current 48, the rate of change of the current 48 may be detected with the current sensor 80 and compared by the discriminator 81 with a threshold value for the rate of change.

The current source 51 with its control circuit 61 counteracts the rise 79 in the current 48 in the circuit 83. The manipulated variable 64 changes during this process. Instead of or in addition to a change in the current 48, the manipulated variable 64 can also be monitored. The absolute value plus preferably a rate of change of the manipulated variable 64 may be compared to a threshold value and the end signal 82 may be output in response to this.

On receiving the end signal 82, the controller 12 terminates the acceleration phase 68. The target value 60 is set at zero. Accordingly the current delivery of the current source 51 is reduced to a current 48 of zero. The striker 4 is not accelerated further in the striking direction 5.

The controller 12 may then start the next active recovery phase 66 directly after the acceleration phase 68 or after a pause.

The invention claimed is:

1. A control method for a machine tool, wherein the machine tool comprises:
   a tool receptacle which supports a chiseling tool such that the chiseling tool is movable along an axis of movement; and
   a magneto-pneumatic striking mechanism comprising:
      a primary drive that is arranged around the axis of movement and that includes, in order in a striking direction, a first magnetic coil, a permanently and radially magnetized ring magnet, and a second magnetic coil;
      a striker and a riveting head on the axis of movement within the first and second magnetic coils and following one another in the striking direction; and
      a pneumatic spring which acts on the striker in the striking direction;
   and comprising the steps of:
   measuring a pressure in the pneumatic spring by a pressure sensor during a movement of the striker in a direction opposite the striking direction;
   starting an acceleration phase by a controller at a start of a drop in the pressure in the pneumatic spring; and
   accelerating the striker by the primary drive during the acceleration phase in the striking direction;
   wherein the striker is accelerated by the primary drive against the striking direction in an active recovery phase until a kinetic energy of the striker is sufficient to achieve a selected compression of the pneumatic spring;
   wherein during the active recovery phase a prognosis unit continuously estimates a compression of the pneumatic spring that is achievable without support of the primary drive.

2. The control method according to claim 1, wherein a first magnetic field generated by the first magnetic coil within the first magnetic coil is superimposed destructively on a magnetic field of the ring magnet in the acceleration phase and wherein a second magnetic field generated by the second magnetic coil within the second magnetic coil is superimposed constructively on the magnetic field of the ring magnet in the acceleration phase.

3. The control method according to claim 1, wherein a resting phase, in which the primary drive is deactivated, follows the active recovery phase.

4. The control method according to claim 3, wherein a duration of the resting phase is at least 10% of a duration of the active recovery phase.

5. The control method according claim 1, wherein a potential energy of the pneumatic spring at the selected compression corresponds to between 25% and 40% of an impact energy of the striker.

6. A machine tool, comprising:
   a tool receptacle which supports a chiseling tool such that the chiseling tool is movable along an axis of movement;
   a magneto-pneumatic striking mechanism comprising:
      a primary drive that is arranged around the axis of movement and that includes, in order in a striking direction, a first magnetic coil, a permanently and radially magnetized ring magnet, and a second magnetic coil;
      a striker and a riveting head on the axis of movement within the first and second magnetic coils and following one another in the striking direction; and
      a pneumatic spring which acts on the striker in the striking direction;
   a pressure sensor, wherein a pressure in the pneumatic spring is determinable by the pressure sensor;
   wherein an acceleration phase is started at a start of a drop in the pressure in the pneumatic spring and wherein the striker is accelerated by the primary drive during the acceleration phase in the striking direction;
   wherein the striker is accelerated by the primary drive against the striking direction in an active recovery phase until a kinetic energy of the striker is sufficient to achieve a selected compression of the pneumatic spring; and
   a prognosis unit, wherein during the active recovery phase the prognosis unit continuously estimates a compression of the pneumatic spring that is achievable without support of the primary drive.

7. The machine tool according to claim 6, wherein a first magnetic field generated by the first magnetic coil within the first magnetic coil is superimposed destructively on a magnetic field of the ring magnet in the acceleration phase and wherein a second magnetic field generated by the second magnetic coil within the second magnetic coil is superimposed constructively on the magnetic field of the ring magnet in the acceleration phase.

8. The machine tool according to claim 6, wherein a resting phase, in which the primary drive is deactivated, follows the active recovery phase.

9. The machine tool according to claim 8, wherein a duration of the resting phase is at least 10% of a duration of the active recovery phase.

10. The machine tool according claim 6, wherein a potential energy of the pneumatic spring at the selected compression corresponds to between 25% and 40% of an impact energy of the striker.

* * * * *